Nov. 4, 1924.  
S. SMITH  
1,514,022

PISTON

Filed Jan. 24, 1924

Inventor  
Sydney Smith  
By  
B. Singer Atty.

Patented Nov. 4, 1924.

1,514,022

UNITED STATES PATENT OFFICE.

SYDNEY SMITH, OF GUNNERSBURY, LONDON, ENGLAND.

PISTON.

Application filed January 24, 1924. Serial No. 688,299.

*To all whom it may concern:*

Be it known that I, SYDNEY SMITH, a subject of the King of Great Britain, and resident of 7 Oxford Road, Gunnersbury, London, England, have invented certain new and useful Improvements in Pistons (for which I have filed application in Great Britain, Serial No. 28,307, filed 18th October, 1922); and I do hereby declare the following to be a full, clear, and exact description of the same.

This invention relates to pistons of the trunk type, i. e. wherein a cross head and guides are not provided, such, for instance, as are commonly used for internal combustion engines. In pistons of this type the oblique thrust of the connecting rod is reversed at each end of the stroke of the piston. If there is any slackness between the piston and the cylinder walls, this reversal will cause the piston to oscillate about the gudgeon pin centre or to move bodily, producing a small knock or tap, the extent of which will, of course, depend upon the clearance between the piston and the cylinder walls.

The object of the present invention is to provide a construction of piston wherein the necessary clearance between the piston and the cylinder walls is obtained, but the liability to knock or tap at the ends of the stroke is eliminated.

According to the present invention, I provide a piston having springy or resilient walls and of substantially elliptical cross section, in which the width in a direction parallel to the gudgeon pin has been reduced progressively from the upper part downwardly, i. e. the reduction is leased at the upper part and greater below, whereby upon being placed in its cylinder the piston takes up a more cylindrical form but has a tendency to resume its elliptical shape, causing a springy or resilient reaction, particulary at the lower part of the piston, against the cylinder walls transversely to the gudgeon pin, whereby at the ends of the stroke the momentum of the piston is destroyed slowly and the piston brought to rest without knock or tap.

One method of manufacturing such pistons consists of turning or otherwise forming the piston to a cylindrical shape, extending the piston in the direction of the axis of the gudgeon pin, grinding or otherwise forming the piston to a truly cylindrical shape while it is extended, and finally allowing the piston to assume its normal position.

When the pistons according to this invention are mounted in their cylinders, the pistons assume a more cylindrical form but have a tendency to resume the elliptical shape, causing a springy or resilient reaction against the cylinder walls transversely to the gudgeon pin, whereby at the ends of the stroke, the momentum is destroyed slowly and the piston brought to rest without knock or tap.

Referring to the drawings:—

Figure 1:
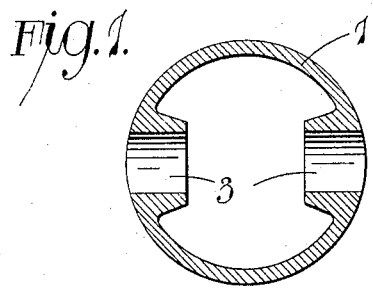
Figure 1 is a sectional plan view of the piston, the section being taken through the axis of the gudgeon pin.

The parts marked $x$ in Figures 2, 3, 4, 6, 7 and 8 are not intended to represent the cylinder in which the piston works, such parts simply being inserted to bring out more clearly the divergence of the piston from the truly cylindrical shape. Further, the extent of the distortion of the piston has been much exaggerated in the drawings for the sake of clearness.

Figure 2:
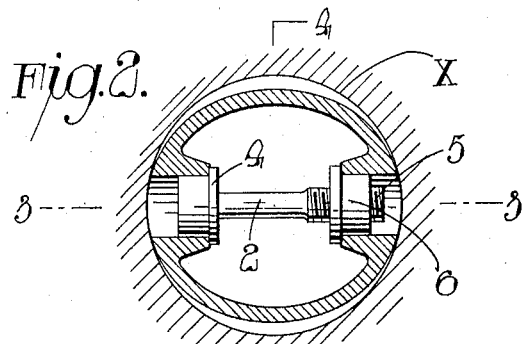
Figure 2 is a sectional plan view shewing the expanding device in operation.
Figure 3:
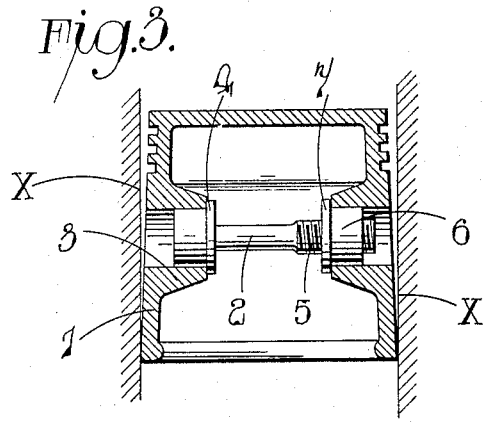
Figure 3 is a sectional elevation upon the line 3—3 of Figure 2.
Figure 4:
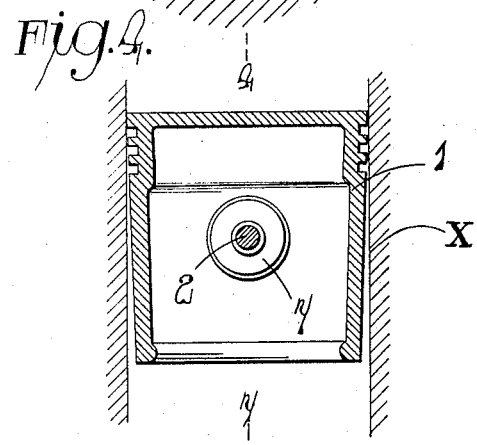
Figure 4 is a sectional elevation upon the line 4—4 of Figure 2.
Figure 5:
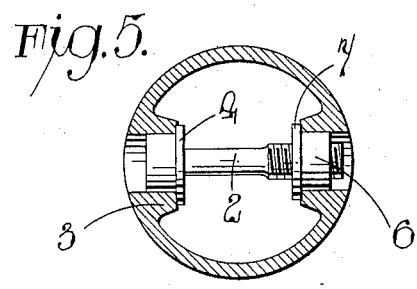
Figure 5 is a sectional plan view with the expanding device still in position but after the grinding operation.
Figure 6:
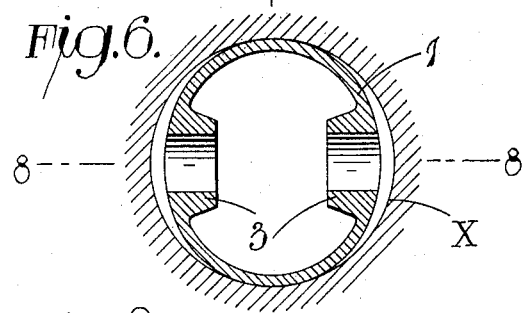
Figure 6 is a sectional plan view of the piston after the expanding device has been removed.
Figure 7:
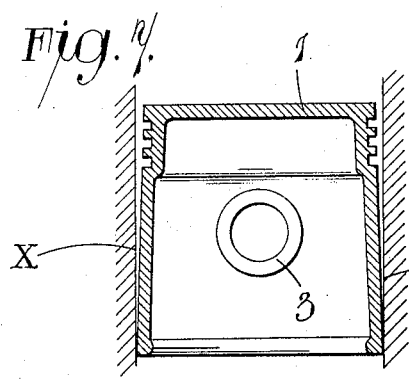
Figure 7 is a sectional elevation on line 7—7 of Figure 6.
Figure 8:
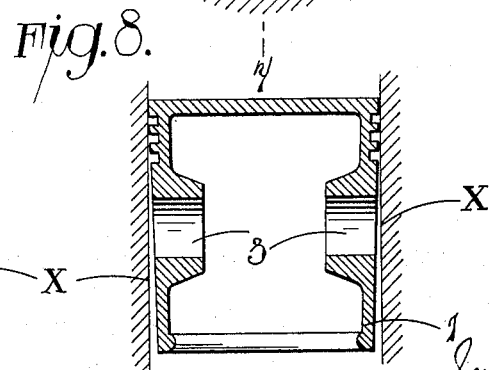
Figure 8 is a sectional elevation on line 8—8 of Figure 6.

The preferred method of manufacturing pistons, as illustrated by Figures 1 to 6 of the accompanying drawings, is first to turn the piston 1 to a diameter which is slightly above the correct finished diameter, as shown in Figure 1. A screw or other expanding member 2 is then placed inside the hollow piston so as to act at two points adjacent to the two gudgeon pin bosses 3. This expanding device forces the piston outwardly at two opposite points near the gudgeon pin bosses. The piston 1 now assumes an oval or elliptical cross section, as shown in Figures 2, 3 and 4, with its greatest transverse dimension parallel with the axis of the gudgeon pin. The distortion of the piston by the expanding device 2 leaves the relatively stiff crown of the piston virtually unaffected, while the width of the piston along the line of the gudgeon pin is increased, while below the gudgeon pin but in the same plane as the gudgeon pin the expansion becomes progressively greater. A corresponding reduction may take place in the width of the piston at right angles to the gudgeon pin, as shown in Figure 4. With the expanding device 2 still in position, the piston is set up in a grinding machine and its exterior is ground truly cylindrical to the required dimensions (Figure 5). When the grinding is finished the expanding device 2 is removed and the piston contracts along the axis of the gudgeon pin, as shown clearly in Figures 6 and 8, until it again assumes an elliptical form in cross section but with the maximum transverse dimension of the ellipse at right angles to the gudgeon pin (Figures 6 and 7).

A suitable form of expanding device 2 is shown in the drawings and comprises a bolt-like portion having an enlarged flange 4 at its one end and provided at its other end with a screwed portion 5. A correspondingly screwed nut 6 having an enlarged flange 7 is provided, the arrangement being such that the flange 4 on the bolt and the flange 7 upon the nut will bear against the gudgeon pin bosses 3, and upon rotating the nut relative to the bolt in the proper direction, the gudgeon pin bosses will be forced outwardly and the piston will take up the before-mentioned elliptical shape. If desired, any other method or device for expanding the piston may be employed.

The degree of this distortion from the circular form in cross section, is, of course, only very slight and well within the elastic limits of the metal which is being used. It is contemplated that the degree of departure from the truly circular form will be about .005 of an inch in a piston of about three inches in diameter.

This invention is applicable to pistons of any metal, such as aluminium alloy, cast iron, steel, malleable iron, or combinations of metals.

What I claim then is—

A piston comprising a hollow trunk having a closed end forming a crown and having a pair of internal bosses for receiving a gudgeon pin, the trunk having elastic walls and being of substantially elliptical cross section, with its exterior width in a direction parallel to the gudgeon pin bosses less than its exterior width at right angles to said bosses, the disparity between these two exterior widths increasing progressively from the upper part near the crown, downwardly whereby upon being placed in its cylinder the piston takes up a more cylindrical form, but has the tendency particularly at its lower and more elastic part, to resume its elliptical shape, causing an elastic reaction against the cylinder walls transversely to the gudgeon pin, whereby at the ends of the stroke, the momentum of the piston is destroyed slowly and the piston is brought to rest without knock or tap.

In witness whereof I affix my signature.

SYDNEY SMITH.